(12) United States Patent
Kurihara et al.

(10) Patent No.: US 6,604,614 B2
(45) Date of Patent: Aug. 12, 2003

(54) ROTARY DAMPER AND ASSIST GRIP DEVICE

(75) Inventors: Kazumasa Kurihara, Fujisawa (JP); Masanobu Kawamoto, Yokohama (JP); Masayuki Nishiyama, Chigasaki (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/050,884

(22) Filed: Jan. 17, 2002

(65) Prior Publication Data

US 2002/0101014 A1 Aug. 1, 2002

(30) Foreign Application Priority Data

Jan. 26, 2001 (JP) ........................ 2001-018113

(51) Int. Cl.[7] .............................................. F16D 57/00
(52) U.S. Cl. ........................................................ 188/290
(58) Field of Search ................................. 188/290, 294

(56) References Cited

U.S. PATENT DOCUMENTS

| 4,513,473 A | | 4/1985 | Omata | |
|---|---|---|---|---|
| 4,653,616 A | * | 3/1987 | Mizusawa | 188/290 |
| 4,694,530 A | * | 9/1987 | Foggini | 16/82 |
| 4,796,733 A | * | 1/1989 | Nakayama | 188/291 |
| 4,869,125 A | * | 9/1989 | Saigusa | 74/574 |
| 4,893,522 A | * | 1/1990 | Arakawa | 74/574 |
| 5,211,269 A | * | 5/1993 | Ohshima | 188/290 |

FOREIGN PATENT DOCUMENTS

| DE | 296 04 260 | 6/1996 |
|---|---|---|
| EP | 0 540 298 | 5/1993 |
| EP | 1 125 790 | 8/2001 |
| WO | 01/10672 | 2/2001 |

OTHER PUBLICATIONS

Applicant's figures 7 and 8.*

* cited by examiner

*Primary Examiner*—Christopher P. Schwartz
*Assistant Examiner*—Devon Kramer
(74) *Attorney, Agent, or Firm*—Kanesaka & Takeuchi

(57) ABSTRACT

A rotary damper includes a housing having an annular groove with an inlet portion, and a rotor having a main annular portion to be inserted into the annular groove and a cap portion attached at one side of the main annular portion. The main annular portion is inserted into the annular groove to form a space therein so that the cap portion closes the annular groove. A plurality of sealing members is situated on inner and outer sides of the main annular portion for sealing the space, and a viscous fluid is filled in the space. An engaging shoulder portion is provided on one of the housing and rotor, and an engaging portion is provided on the other of the housing and rotor for engaging said engaging shoulder portion.

6 Claims, 5 Drawing Sheets

ROTARY DAMPER AND ASSIST GRIP DEVICE

BACKGROUND OF THE INVENTION AND RELATED ART STATEMENT

The invention relates to a rotary damper for damping a relative rotation of a housing or a rotor by resistance of a viscous fluid, and an assist grip device using the same.

FIG. 6 is a perspective view showing an example of a conventional rotary damper, and FIG. 7 is a sectional view taken along line 7—7 in FIG. 6.

In these drawings, D represents a rotary damper. The rotary damper includes a housing 1; a rotor 8 and a main portion 9 which are inserted into an annular chamber 5 of the housing 1; O-shaped rings 12 and 13 as sealing members for sealing between the rotor 8 and the housing 1; and a viscous fluid 15, such as silicone oil, to be filled into a fill space 14 formed by the housing 1, rotor 8 and O-shaped rings 12 and 13.

The housing 1 includes a bottom 2 in an annular ring shape; an outer cylindrical circumferential wall 3 continuously disposed on an outer circumferential edge of the bottom 2; and an inner cylindrical circumferential wall 4 continuously disposed on an inner circumferential edge of the bottom 2.

The outer circumferential wall 3 is provided with an annular step 3a on an inner side of a forward end thereof for receiving therein the O-shaped ring 12; an annular portion 3b on the forward end side of the step 3a; and a protrusion 3c extending in an axial direction on an outer circumference thereof with a predetermined height. The inner circumferential wall 4 includes an annular step 4a for receiving therein the O-shaped ring 13 on an outer side of the forward end thereof.

Incidentally, the circular annular chamber 5 is formed of the bottom 2, the outer circumferential wall 3 and the inner circumferential wall 4. An insertion hole 6 is formed at the center, i.e. inner side, of the inner circumferential wall 4.

The rotor 8 is structured by a rotor main portion 9 to be inserted into the annular chamber 5 of the housing 1; a circular through-hole 10a continuously connected to the rotor main portion 9 and communicating with the insertion hole 6 of the housing 1; and a circular cap portion 10 for closing the annular chamber 5. The cap portion 10 is provided, on an outer circumferential surface thereof, with an annular convex portion 10b to fit the annular portion 3b of the outer circumferential wall 3, and on an outer side surface thereof, with engaging projections 10c extending along a diameter direction.

The rotary damper D, structured as described above, damps relative rotation of the housing 1 and the rotor 8, when the housing 1 and the rotor 8 are relatively rotated, by the viscous and shear resistance of the viscous fluid 15 passing between the outer circumferential wall 3 and the rotor main portion 9 and between the inner circumferential wall 4 and the rotor main portion 9.

Incidentally, the rotary damper D as described above is disclosed in, for example, West Germany Utility Model No. 296 04 260 U1.

The conventional rotary damper D as described above has a simple structure such that the annular convex portion 10b of the cap portion 10 is fit into the annular concave portion 3b of the outer circumferential wall 3 to thereby attach the rotor 8 to the housing 1. Therefore, it is possible to lower a cost of an attaching structure, so that the rotary damper can be provided at a low cost.

However, since the attaching structure between the rotor 8 and the housing 1 is a simple engagement, it is difficult to secure a tight sealing therebetween to prevent the viscous fluid 15 from leaking. When the viscous fluid 15 leaks, an effective damping force can not be obtained.

To prevent the inner fluid leak, the main portion 9 of the rotor 8 and the cap portion 10 can be structured separately so that the rotor can rotate, and then the cap portion 10 is welded to the housing. In this structure, it is possible to secure the sealing and prevent the viscous fluid leak. However, the structure cost for securing the sealing becomes higher, resulting in a higher price of the rotary damper.

The present invention has been made to obviate the above-described disadvantages, and an object of the present invention is to provide a rotary damper, wherein sufficient sealing ability can be obtained and the rotary damper can be produced at a low cost.

Another object of the present invention is to provide an assist grip device using the rotary damper as stated above.

Further objects and advantages of the invention will be apparent from the following description of the invention.

SUMMARY OF THE INVENTION

In the present invention, a rotary damper includes a housing having an annular chamber; a rotor with a main body inserted into the annular chamber and a cap portion to close the annular chamber; sealing members for sealing between the rotor and the housing; and a viscous fluid filled in a fill space formed by the housing, rotor and sealing members. More specifically, the rotor is attached to the housing with a structure such that an engaging shoulder portion is provided on one of the housing and the rotor, and an engaging portion is provided on the other thereof. As the engaging portion engages the engaging shoulder portion, the rotor can be securely attached to the housing with tight sealing, and the rotor and the housing can be easily assembled.

It is preferable that an insertion hole is provided at the center of the annular chamber of the housing; an insertion cylinder communicating with the through hole and to be fitted into the insertion hole is provided to the rotor; an engaging portion is provided to the insertion cylinder; an engaging shoulder portion is provided to the housing; and, further, the engaging portion is formed by clamping.

Also, when the rotary damper is used in an assist grip device that is urged to a return position by an urging device, the rotational movement is damped by the rotary damper.

DETAILED DESCRIPTION OF THE PREFERRED EMBODIMENTS

Hereunder, the embodiments according to the invention will be described with reference to the accompanying drawings.

Figure 1:
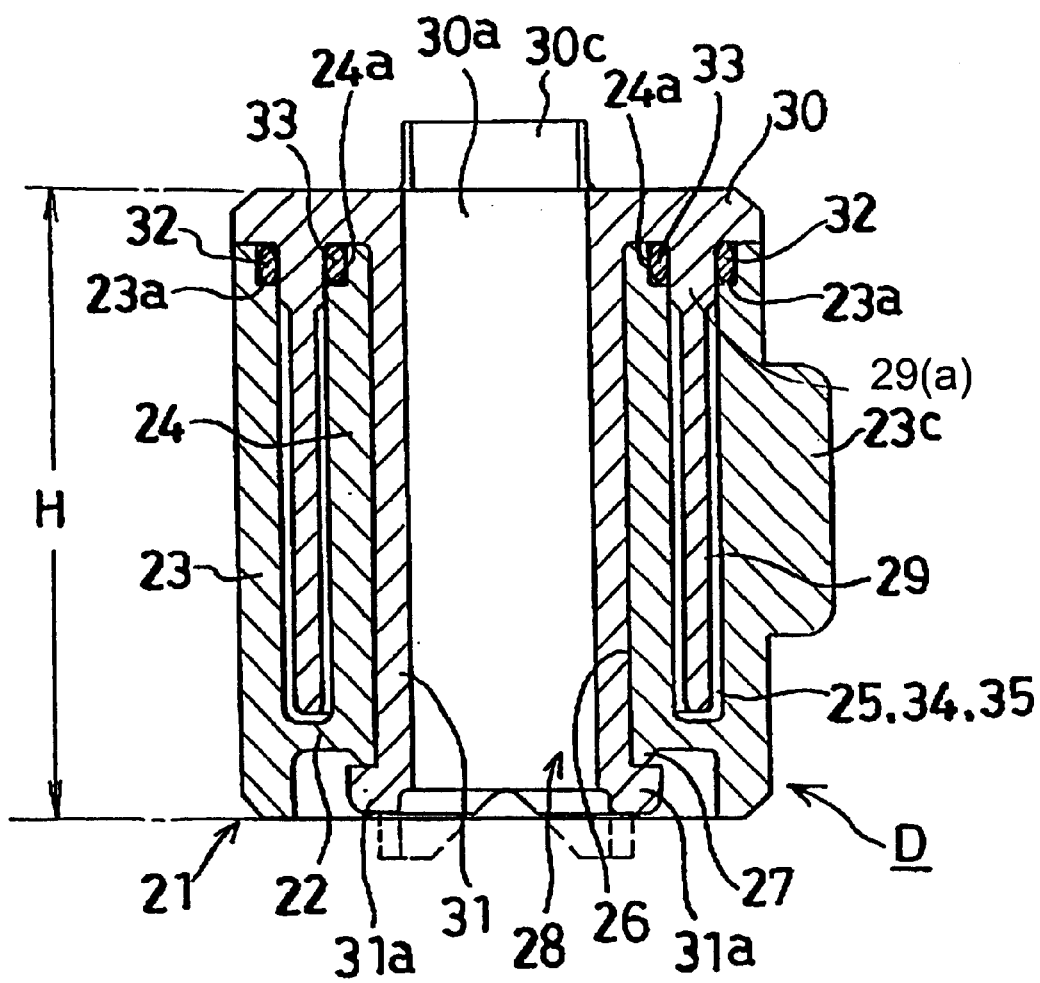
FIG. 1 is a sectional view of the first embodiment of a rotary damper according to the present invention.
Figure 2:
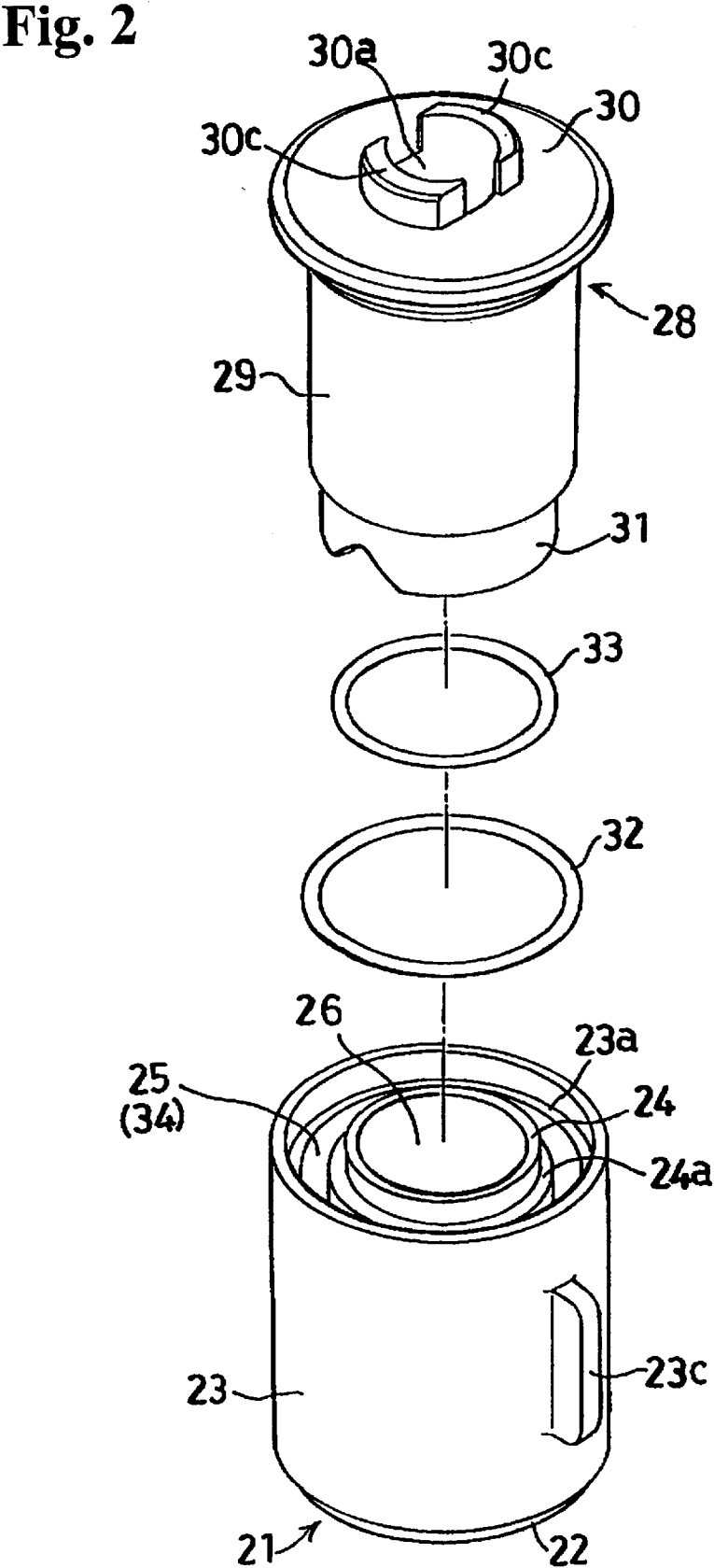
FIG. 2 is an exploded perspective view of the rotary damper as shown in FIG. 1.

FIG. 1 is a vertical section view of a rotary damper according to the present invention; and FIG. 2 is an exploded perspective view of the rotary damper as shown in FIG. 1.

In the drawings, D represents a rotary damper. The rotary damper D includes a housing 21 made of a synthetic resin; a rotor 28 also made of a synthetic resin, wherein a rotor main portion 29 is inserted into an annular chamber or groove 25 of the housing 21; O-shaped rings 32, 33 as sealing members for sealing between the rotor 28 and the housing 21; and a viscous fluid 35, such as silicone oil, to be filled into a fill space 34 formed of the housing 21, rotor 28 and O-shaped rings 32, 33.

The housing 21 is formed of a bottom 22 in an annulus ring shape, a cylindrical outer circumferential wall 23 continuously connected to an outer circumferential edge of the bottom 22; and a cylindrical inner circumferential wall 24 continuously connected to an inner circumferential edge of the bottom 22.

The outer circumferential wall 23 of the housing 21 includes an annular step 23a for receiving thereon the O-shaped ring 32 at an inner side of the forward end thereof, and a protrusion 23c extending in an axial direction of an outer circumference with a predetermined height. Also, the inner circumferential wall 24 includes an annular step 24a for receiving thereon the O-shaped ring 33 on an outer side of the forward end thereof. Incidentally, the annular chamber 25 is formed of the bottom 22, outer circumferential wall 23 and the inner circumferential wall 24.

An insertion hole 26 is provided at the center, i.e. an inner side, of the inner circumferential wall 24, and an engagement shoulder portion 27 is formed of the inner circumferential wall 24 and the bottom 22 on the side opposite to the annular chamber 25 so as to communicate with the insertion hole 26.

The above described rotor 28 includes the cylindrical rotor main portion 29 to be inserted into the annular chamber 25 of the housing 21; a circular through-hole 30a to be entered into the insertion hole 26 of the housing 21 and continuously formed with the rotor main portion 29; and a circular cap portion 30 to close the annular chamber 25. The rotor main portion 29 has a base 29a having a thickness greater than that of the rotor main portion 29 or thin portion. The base 29a directly contacts the O-shaped rings 32, 33 to seal thereat, and the thin portion is located in the fill space 34 as the damping portion.

On an outer surface of the cap portion 30, there are provided annular engaging projections 30c with a whirl-stopper, which is called an I-shaped cut, formed by notches provided in symmetry in an axial direction, in a cylindrical shape concentrically with the through-hole 30a. On an inner surface of the cap portion 30, there is provided an insertion cylinder 31 defining the through-hole 30a and fitting into the insertion hole 26 of the housing 21.

Next, the assembling of the rotor 28 and the housing 21 will be explained. First, a viscous fluid 35 is injected into the annular chamber 25 of the housing 21 by a predetermined quantity. After the O-shaped rings 32, 33 are attached to an outer and an inner side of the rotor main portion 29 constituting the rotor 28, the insertion cylinder 31 is inserted into the insertion hole 26. Then, the forward end of the rotor main portion 29 is inserted into the annular chamber 25, and the rotor 28 is pushed in until the cap portion 30 abuts against the inner and the outer circumferential wall 24, 23.

When the rotor 28 is pushed in as described above, the space between the housing 21 and the rotor 28, i.e. the fill space 34, is sealed by the O-shaped rings 32, 33 received at the steps 23a, 24a, and the insertion cylinder 31 slightly projects downward from the lower end of the housing 21, as shown by a dotted line in FIG. 1.

Next, in a state where the cap portion 30 abuts against the inner and the outer circumferential walls 24, 23, as shown by solid lines in FIG. 1, the lower end of the insertion cylinder 31 is clamped to form a clamped portion 31a, i.e. an engaging portion, by using a clamping jig. The clamped portion 31a engages the engaging shoulder portion 27, and at the same time, the clamped portion 31a is received in the engaging shoulder portion 27 to thereby complete the assembly.

As described above, according to the first embodiment of the rotary damper D of the present invention, since the rotary damper D is structured such that after the insertion cylinder 31 is inserted into the insertion hole 26, the lower end of the insertion cylinder 31 projecting downward from the engaging shoulder portion 27 is clamped to form the clamped portion 31a, i.e. an engaging portion, and the clamped portion 31a is engaged with the engaging shoulder portion 27, the rotor 28 is securely attached to the housing 21 with tight sealing and easily assembled thereto.

As described above, since the viscous fluid 35 will not leak through the secure attachment of the rotor 28 to the housing 21 easily, the constant torque can be achieved for a highly reliable rotary damper D. Further, since the assembly cost of the rotating damper D can be lowered due to a good workability, a lower cost rotary damper D can be provided.

Also, since the clamped portion 31a, i.e. an engaging portion, is received in the engaging shoulder portion 27, the clamped portion 31a does not protrude outwardly from the housing 21, so that the appearance of the rotary damper D is preserved, and at the same time, no protrusion is formed which may catch the bottom 22 otherwise.

Figure 3:
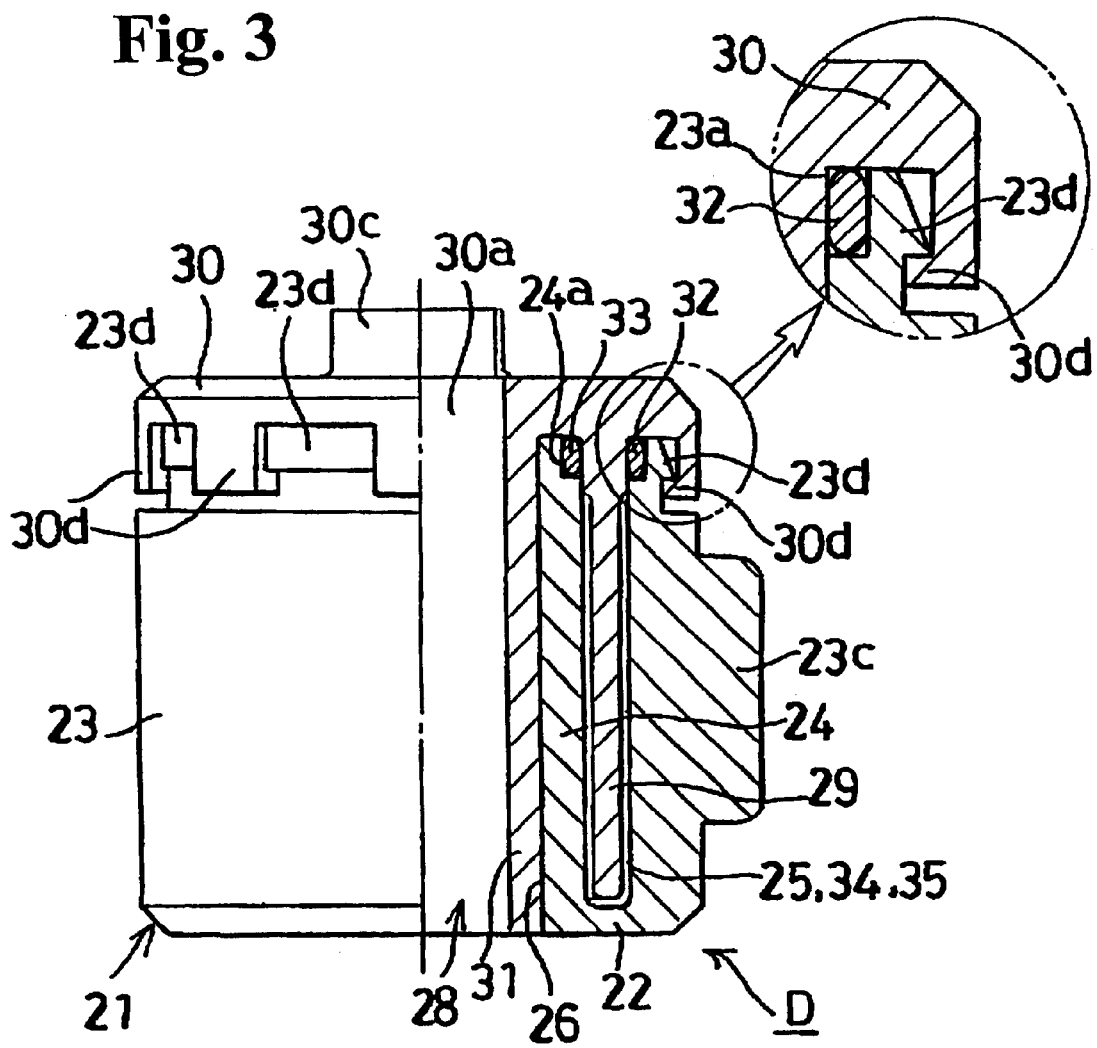
FIG. 3 is a front view, with a vertical section on the right half side, of the second embodiment of a rotary damper according to the present invention.

FIG. 3 shows a front view, with a section on a right half side, of the second embodiment of a rotary damper according to the present invention, wherein the portions corresponding to those in FIGS. 1 and 2 are represented by the same symbols and explanations thereof are omitted.

In FIG. 3, reference numeral 23d represents an engaging shoulder portion, and is formed in an annular shape on an outer side of the forward end of the outer circumferential wall 23 so that an inclined surface is formed toward the forward end side of the outer circumferential wall 23 to be contracted in a shape of a conical surface.

The engaging shoulder portion 23d is formed such that when the engaging claw 30d, described later, engages the engaging shoulder portion 23d, an outer circumferential surface of the engaging claw 30d does not protrude from the outer circumferential surface of the outer circumferential wall 23. Preferably, both outer circumferential surfaces are to be aligned in the same surface. There is provided a plurality of engaging claws 30d as engaging portions, and the engaging claws are disposed with a predetermined interval therebetween on an outer circumferential edge of a cap portion 30 and are provided in the same direction as that of the insertion cylinder 31.

Next, an assembling process will be explained. First, a viscous fluid 35 is injected into the annular chamber 25 of the housing 21 with a predetermined quantity.

Then, after the O-shaped rings 32, 33 are attached to the outer and inner sides of the rotor main portion 29 constituting the rotor 28, the insertion cylinder 31 is inserted into the insertion hole 26. The forward end of the rotor main portion 29 is inserted into the annular chamber 25 and the rotor 28 is pushed in until the cap portion 30 abuts against the inner and the outer circumferential walls 24, 23.

When the rotor 28 is pushed in as described above, the fill space 34, i.e. the space between the housing 21 and the rotor 28, is sealed by the O-shaped rings 32, 33 received at the steps 23a, 24a. Also, since each engaging claw 30d is bent outward and returns to the original state by its own elasticity, when the engaging claw 30d passes over the engaging shoulder portion 23d, as shown in FIG. 3, the engaging claw 30d engages the engaging shoulder portion 23d to thereby complete the assembling.

In the second embodiment of the rotary damper D, also, the same effects as those in the first embodiment of the rotary damper D can be obtained. Since only the engaging claws 30d, i.e. engaging portions, engage the engaging shoulder portion 23d, the assembling thereof is simple and the engaging claws 30d can be securely engaged with the engaging shoulder portion 23d.

Figure 4:
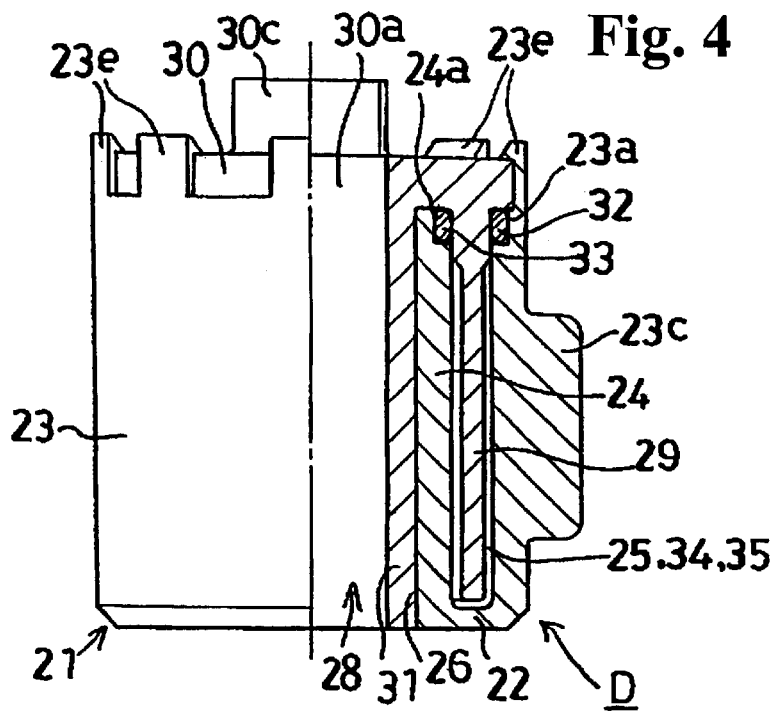
FIG. 4 is a front view, with a vertical section on the right half side, of the third embodiment of a rotary damper according to the present invention.

FIG. 4 is a front view, with a section on the right half side, of the third embodiment of a rotary damper according to the present invention, and the same portions as, or portions corresponding to, those in FIGS. 1–3 are represented by the same symbols, and explanations thereof are omitted.

In FIG. 4, reference numeral 23e represents an engaging claw 23e as an engaging portion, and a plurality of the engaging claws is disposed with a predetermined interval therebetween along an outer circumferential edge of the outer circumferential wall 23, in the same direction as that of the outer circumferential wall 23.

Incidentally, in the embodiment, the circumferential edge of the outer side surface of the cap portion 30 corresponds to the engaging shoulder portion. The plural engaging claws 23e are disposed such that the outer circumferential surfaces of the engaging claws 23e do not protrude from the outer circumferential surface of the outer circumferential wall 23, or preferably are aligned in the same surface.

Since the rotary damper D according to the third embodiment can be assembled in the same manner as that of the second embodiment, explanation for the assembling is omitted. In the third embodiment of the rotary damper D, also, the same effect as those in the first and second embodiments can be obtained.

Figure 5:
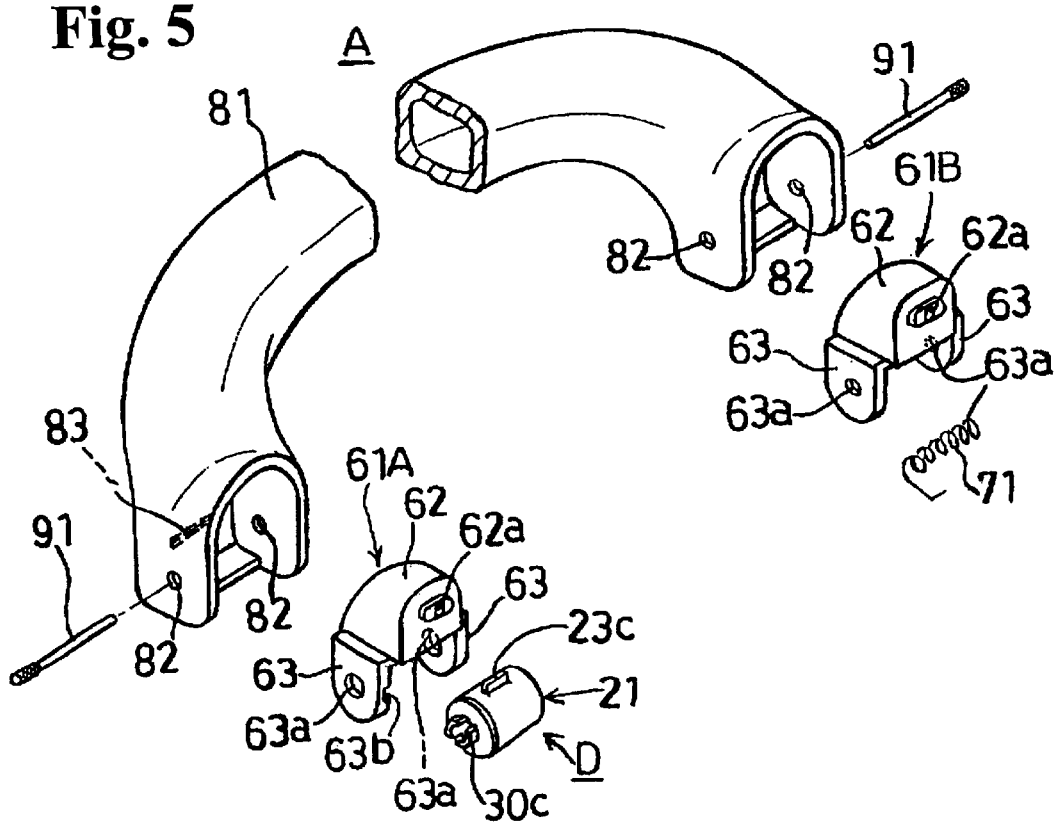
FIG. 5 is a partially omitted exploded perspective view of an embodiment of an assist grip device according to the present invention.
Figure 7:
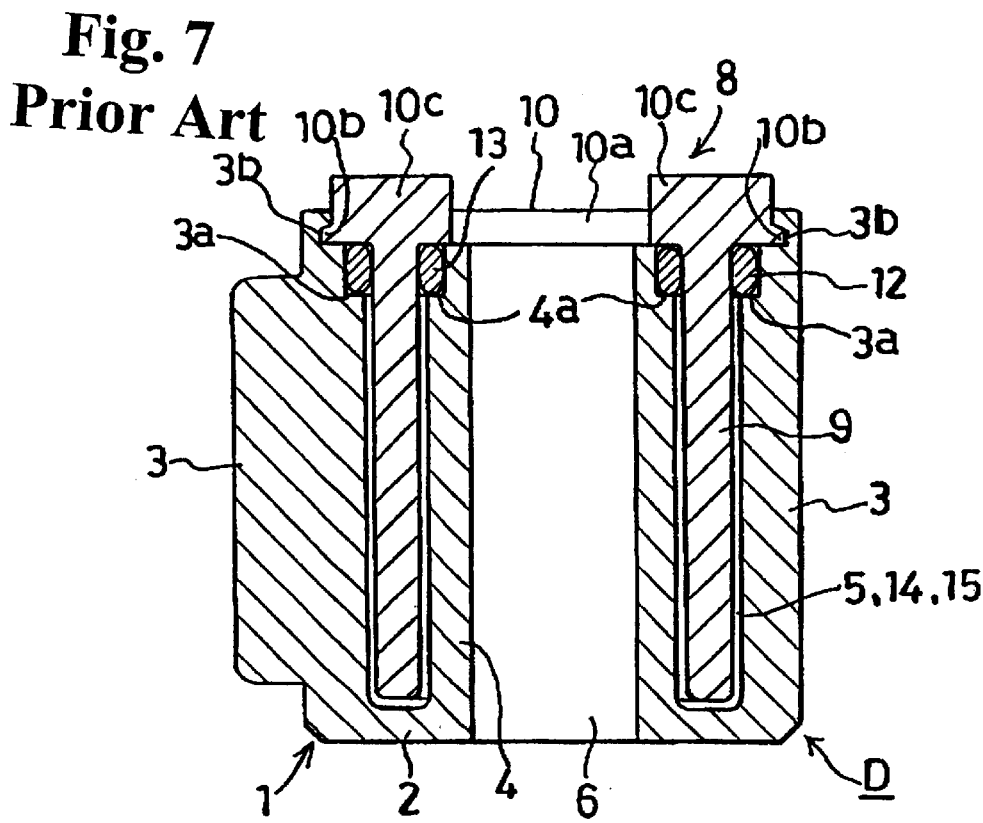
FIG. 7 is a sectional view taken along line 7—7 in FIG. 6.
Figure 6:
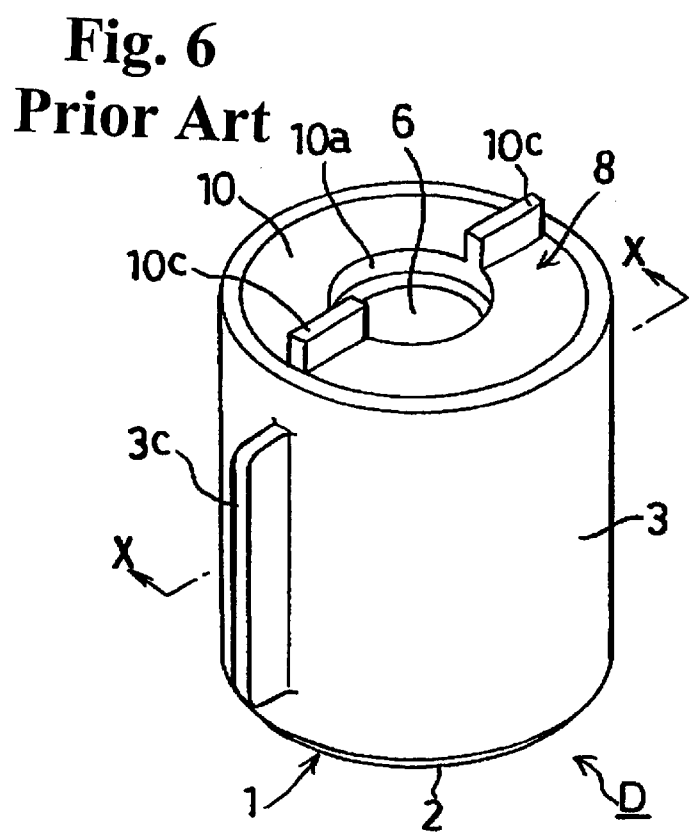
FIG. 6 is a perspective view showing an example of a conventional rotary damper.

FIG. 5 is a partially omitted exploded perspective view of an embodiment of an assist grip device according to the present invention, wherein portions same as, or corresponding to, those in FIGS. 1 to 4 are represented by the same symbols, and explanations thereof are omitted. Incidentally, in the embodiment of the assist grip device, the first embodiment of the rotary damper D is employed.

In FIG. 5, a letter A represents an assist grip device. The assist grip device A includes brackets (holders) 61A and 61B for attaching an assist grip 81, described later, to a predetermined position; a rotary damper D for damping rotation of the assist grip 81; a torsion spring 71 as an urging device for urging the assist grip 81 to a return position; a U-shaped assist grip 81 with both ends being attached to the brackets 61A and 61B; and supporting shafts 91 for attaching the rotary damper D, torsion spring 71 and assist grip 81 to the brackets 61A, 61B.

Each of the brackets 61A and 61B is formed of an attaching portion 62 having an attaching hole 62a, a pair of shaft supporting holes 63a for supporting the supporting shaft 91 and a pair of supporting members 63 facing each other and suspended from the attaching portion 62. An interval between the supporting members 63 is substantially a height of the rotary damper D (a height H except for the annular engaging projection 30c as shown in FIG. 1). Also, a groove 63b as an engaging portion, which engages the annular engaging projection 30c of the rotary damper D, is provided linearly on an inner side of one of the supporting members 63 of the bracket 61A from one end thereof so as to slightly pass through the shaft supporting hole 63a.

Both end portions of the assist grip 81 for covering the brackets 61A and 61B are provided with facing insertion holes 82 for inserting the supporting shaft 91 therein. The end portion of the assist grip 81 for covering the bracket 61A is provided with a fitting opening 83, or fitting concave portion, that fits the protrusion 23c of the rotary damper D.

Next, an example for attaching the assist grip 81 will be explained. First, each bracket 61A and 61B is attached to a predetermined position, not shown, by using attaching screws (not shown) and the attaching holes 62a. Then, the annular engaging projection 30c is fit into the groove 63b to thereby position the rotary damper D between the supporting members 63 of the bracket 61A. At this time, the housing 21 is rotated to a position where the protrusion 23c fits the fitting opening 83 when the assist grip 81 is attached later.

Next, the brackets 61A and 61B are covered by the end portions of the assist grip 81 while the protrusion 23c is being fitted into the fitting opening 83. The supporting shaft 91 is inserted into the through-hole 82, the annular engaging projection 30c, the through-hole 30a, the insertion cylinder 31 and the insertion hole 82 to thereby attach one end of the assist grip 81 to the bracket 61A. Also, another supporting shaft 91 is inserted into the through-hole 82, the torsion spring 71 and the through-hole 82 to thereby attach the other end of the assist grip 81 to the bracket 61B.

Incidentally, the torsion spring 71 is provided so as to urge the assist grip 81 to return to a return position, for example, a predetermined upper position.

Next, operations of the assist grip will be explained. In order to use the assist grip 81 attached as described above, when the assist grip 81 is pulled to rotate downward against the urging force of the torsion spring 71 while holding the assist grip 81, the housing 21 is rotated through the protrusion 23c fitted into the fitting opening 83 and rotation of the assist grip 81 is damped since the rotor 28 can not rotate due to the annular engaging projection 30c fitted into the groove 63b.

Then, when the assist grip 81 is released to return to a return position, the assist grip 81 rotates back by the urging force of the torsion spring 71. During the return movement, the rotation of the assist grip 81 is damped.

According to the embodiment of the assist grip device A of the present invention, since the groove 63b, which engages the annular engaging projection 30c, is provided to the bracket 61A, the housing 21 and the rotor 28 can be relatively rotated.

Also, since the rotary damper D is provided on the supporting shaft 91, supporting portions of the assist grip 81 can be made compact.

Incidentally, since the explanations of the assist grip devices A using the second and third embodiments of the rotary damper D are the same as that using the first embodiment, their explanations are omitted. In the assist grip devices A using the second and third embodiments, the same effects as that in the first embodiment of the rotary damper D can be obtained.

In the embodiments of the rotary dampers D as described above, the protrusion 23c as an engaging device is provided on the outer circumferential wall 23 of the housing 21 and engages the fitting opening 83 of the assist grip 81. However, instead of the protrusion 23c and the fitting opening 83, an outer shape of the outer circumferential wall 23 may be formed to be a shape other than a circular shape and the housing 21 may be rotated together with the assist grip 81 so as to also work as an engaging device.

Also, in the first embodiment of the rotary damper D, although the forward end of the insertion cylinder 31 is clamped to form the engaging portion, the engaging portion may be structured such that an engaging claw having an elasticity is provided as an engaging portion at the forward end of the insertion cylinder 31, and the engaging claw is engaged with the engaging shoulder portion 27.

Next, in the embodiment of the assist grip device A, although the supporting shaft 91 is inserted through the annular engaging projection 30c, the through-hole 30a and the insertion cylinder 31 to thereby dispose the rotary damper D on the supporting shaft 91, the rotary damper D may be disposed on an extended line of the supporting shaft 91 as the supporting shaft, or there may be employed a structure such that the rotary damper D is disposed at a position away from the supporting shaft 91, and the rotating force of the supporting shaft 91 rotating together with the assist grip 81 is transmitted to the rotor 28 by a transmitting mechanism through gears. With these mechanisms, the rotation of the assist grip 81 can be damped.

As described above, according to the rotary damper of the present invention, a rotor is attached to a housing with a structure such that an engaging shoulder portion is provided to one of the housing and the rotor and an engaging portion is provided to the other thereof. As the engaging portion can engage the engaging shoulder portion, the rotor can be securely attached to the housing with tight sealing arid, at the same time, the rotor and housing can be easily assembled.

Since the viscous fluid will not leak easily as the rotor is securely attached to the housing and the constant torque will be achieved, a highly reliable rotary damper can be provided. Also, since the rotary damper can be easily assembled with good workability, a rotary damper can be manufactured at a lower cost to thereby provide the rotary damper at a low price.

An insertion hole is disposed at the center of the annular chamber of the housing. The rotor is provided with an insertion cylinder to be fitted into the insertion hole. Additionally, the insertion cylinder is provided with an engaging portion. Consequently, the rotor can rotate easily and is securely attached to the housing by just inserting the insertion cylinder into the insertion hole.

Further, since the engaging shoulder portion is provided at a recess portion of the housing, the engaging portion engages the engaging shoulder portion so that the engaging portion does not protrude from the housing. Thus, a good appearance is preserved and there is no protrusion which may catch other parts.

Further, when the engaging portion is formed by clamping, the rotor is more securely attached to the housing.

According to the assist grip device of the present invention, since the rotation of the assist grip is damped by the rotary damper of the present invention, reliable damping effects can be obtained.

While the invention has been explained with reference to the specific embodiments of the invention, the explanation is illustrative and the invention is limited only by the appended claims.

What is claimed is:

1. A rotary damper comprising:
   a housing having an annular groove with an inlet portion, and an insertion hole at a center thereof;
   a rotor having a main annular portion to be inserted into said annular groove, a cap portion attached at one side of the main annular portion, and an insertion cylinder situated radially inside the main annular portion and rotationally located in the insertion hole, said main annular portion being inserted into the annular groove to form a space therein so that the cap portion closes the annular groove,
   a plurality of sealing members situated on inner and outer sides of the main annular portion for sealing the space,
   a viscous fluid filled in the space,
   an engaging shoulder portion provided on one of said housing and rotor; and
   an engaging portion provided on the other of the housing and rotor for engaging said engaging shoulder portion.

2. A rotary damper as claimed in claim 1, wherein said housing has a recess portion facing the insertion hole at a side opposite to the inlet portion to form the engaging shoulder portion thereat, and said engaging portion is formed on the insertion cylinder at a side opposite to the cap.

3. A rotary damper as claimed in claim 2, wherein said engaging portion is projections formed on the insertion cylinder bent toward the engaging shoulder portion to engage the same.

4. A rotary damper as claimed in claim 1, wherein said cap has projections with engaging claws at an outer periphery thereof extending in a direction as in the main annular portion as the engaging portion, and said housing has the engaging shoulder portion outside the annular groove to engage the engaging claws.

5. A rotary damper as claimed in claim 1, wherein said main annular portion has a base and a front portion extending from the base, said base having a thickness greater than that of the front portion and directly contacting the sealing members to seal thereat, said front portion being located in the annular groove as a damping portion.

6. An assist grip device comprising:
   an assist grip,
   an urging device attached to the assist grip to urge the assist grip to return to a return position, and said rotary damper as claimed in claim 1 and attached to the assist grip.

* * * * *